US006959111B2

(12) United States Patent
Hirayama et al.

(10) Patent No.: US 6,959,111 B2
(45) Date of Patent: Oct. 25, 2005

(54) COMPUTER COLOR-MATCHING APPARATUS AND PAINT COLOR-MATCHING METHOD USING THE APPARATUS

(75) Inventors: Tohru Hirayama, Chigasaki (JP); Shinichi Gamou, Hiratsuka (JP)

(73) Assignee: Kansai Paint Co., Ltd., Hyogo (JP)

(*) Notice: Subject to any disclaimer, the term of this patent is extended or adjusted under 35 U.S.C. 154(b) by 569 days.

(21) Appl. No.: 09/773,537

(22) Filed: Feb. 2, 2001

(65) Prior Publication Data

US 2001/0036309 A1 Nov. 1, 2001

(30) Foreign Application Priority Data

Feb. 4, 2000 (JP) ........................................ 2000-028414

(51) Int. Cl.[7] ........................................ G06K 9/00

(52) U.S. Cl. ........................ 382/167; 382/165; 345/589; 356/319

(58) Field of Search ................................ 382/162, 164, 382/165, 167; 345/589; 356/300, 306, 319–325, 402–408; 702/127

(56) References Cited

U.S. PATENT DOCUMENTS

| | | | | | |
|---|---|---|---|---|---|
| 4,479,718 | A | * | 10/1984 | Alman | 356/405 |
| 4,813,000 | A | * | 3/1989 | Wyman et al. | 382/165 |
| 5,387,977 | A | * | 2/1995 | Berg et al. | 356/407 |
| 5,706,083 | A | * | 1/1998 | Iida et al. | 356/328 |
| 5,917,541 | A | * | 6/1999 | Nakagome et al. | 348/93 |
| 6,362,885 | B1 | | 3/2002 | Osumi et al. | 356/402 |
| 6,522,977 | B2 | * | 2/2003 | Corrigan et al. | 702/32 |
| 6,539,325 | B1 | * | 3/2003 | Numata et al. | 702/127 |

FOREIGN PATENT DOCUMENTS

| | | | | |
|---|---|---|---|---|
| JP | 10170436 A | * | 6/1998 | G01N/21/47 |
| JP | 10-310727 | | 11/1998 | |
| JP | 10-324829 | | 12/1998 | |

OTHER PUBLICATIONS

English version of JP 10–170436 (by machine translation).*

James E. Proctor & P. Yvonne Barnes, "NIST High Accuracy Reference Reflectometer–Spectrophotometer," J. Research of the NIST, vol. 101, No. 5, Sep.–Oct. 1996, pp. 619–627.*

Li–Piin Sung, Maria E. Nadal, Mary E. McKnight & Egon Marx, "Optical Reflectance of Metallic Coatings: Effect of Aluminum Flake Orientation," J. Coatings Technology, vol. 74, No. 932, Sep. 2002, pp. 55–63.*

* cited by examiner

*Primary Examiner*—Bhavesh M. Mehta
*Assistant Examiner*—Yubin Hung
(74) *Attorney, Agent, or Firm*—Wenderoth, Lind & Ponack, L.L.P.

(57) ABSTRACT

A computer color-matching apparatus includes a colorimeter, a micro-brilliance-feeling measuring device, and a computer in which a plurality of paint blends, color data and micro-brilliance-feeling data corresponding to each of the paint blends, and the color characteristic data and micro-brilliance-feeling characteristic of a plurality of full-color paints are entered. A computer color-matching method for brilliant paints includes measuring the paint film of a reference color by a colorimeter to obtain the color data of the reference color, measuring the paint film of a reference color by a micro-brilliance-feeling measuring device to obtain micro-brilliance-feeling data of the reference color, and comparing the color data and micro-brilliance-feeling data of the reference color with the color data and micro-brilliance-feeling data corresponding to the paint blend previously entered in a computer, and selecting a prospective paint blend.

10 Claims, 1 Drawing Sheet

COMPUTER COLOR-MATCHING APPARATUS AND PAINT COLOR-MATCHING METHOD USING THE APPARATUS

FIELD OF THE INVENTION

The present invention relates to a computer color-matching apparatus and a paint color-matching method using the apparatus.

BACKGROUND AND PRIOR ART OF THE INVENTION

A color-matching system using a computer is publicly known because it is disclosed in the specification of U.S. Pat. No. 3,601,589. The above-identified U.S. Patent discloses a method in which the total spectrum reflectance of an unknown color panel is decided by a spectrophotometer, the reflectance is sent to a computer, and the computer mathematically processes the previously-stored data showing the K-value (showing "light absorbing coefficient") and S-value (showing "light scattering coefficient") of a pigment and performs logical color-matching.

The contents disclosed in the above-identified U.S. Patent relates a set of calculation procedures. That is, according to the calculation procedures, it is possible to calculate the K-value and S-value of a set of wavelengths and moreover, decide a set of pigments so that the K-value and S-value of the pigments become equal to the K- and S-values of an unknown color for each wavelength of the wavelength set. This is a basic color-matching algorithm also used for other spectrophotometric color-matching systems.

The system according to the above-identified U.S. Patent has problems in that, first, the system is very expensive and it is difficult to maintain the system, and second, the system performs logical color-matching using the data obtained from unknown and already-known pigments of unknown colors. That is, a final color obtained by mixing pigments in accordance with a calculated color value may become a color different from the above unknown color. Therefore, the above color-matching formula is usually a primary mathematical approximation method and therefore, it is necessary to correct and adjust the system by correcting the software that is a part of the system.

To improve the above-described system, Japanese Patent Laid-Open No. 153677/1988 discloses a method and an apparatus of analyzing a selected color by using a portable color meter, storing the color data showing the hue, chroma, and brightness, connecting the color data in the color meter to a computer, storing a plurality of usable color formulas (paint blending) in the computer, storing the color data showing the hue, chroma, and value (brightness) of each paint designated by the stored usable color formulas in the computer, comparing the color data of the selected color received from the color meter with the stored color data showing the stored usable color formulas to find the best approximation matching, selecting a stored color formula shown by the color data found as the best approximation matching, and thereby color-matching the selected color.

Moreover, the number of brilliant paint colors of automobiles has been increased in which aluminum powder or brilliant mica powder is blended from the viewpoint of diversity of personal likeness or improvement of beauty culture. When performing color-matching to refinish-apply the brilliant paint color, the color-matching accuracy is not sufficient in the case of the color-matching method disclosed in Japanese Patent Laid-Open No. 153677/1988. Thus, there has not been any high-accuracy color-matching method of a brilliant paint color using a computer.

It is an object of the present invention to provide a computer color-matching method capable of color-matching a brilliant paint color at a high accuracy. It is another object of the present invention to provide a computer color-matching apparatus that can be used for the computer color-matching method.

SUMMARY OF THE INVENTION

The present inventor et al. find that the above objects can be achieved by using a computer color-matching apparatus constituted of a colorimeter, a micro-brilliance-feeling measuring device, and a computer to which various paint blends, color data and micro-brilliance-feeling data are input and in which a color-matching-calculation logic operates and complete the present invention.

That is, the present invention provides a computer color-matching apparatus for paints comprising (A) a calorimeter, (B) a micro-brilliance-feeling measuring device, and (C) a computer in which a plurality of paint blends, color data and micro-brilliance-feeling data corresponding to each of the paint blends, and color characteristic data and micro-brilliance-feeling data for a plurality of full color paints are entered and a color-matching-calculation logic using the paint blends and the data operates.

Moreover, the present invention provides the computer color-matching apparatus in which color numbers corresponding to a plurality of paint blends to be entered in the computer (C) are entered in the computer (C).

Furthermore, the present invention provides a computer color-matching method for executing the following steps (1) to (3) by using a computer color-matching apparatus constituted of (A) a colorimeter, (B) a micro-brilliance-feeling measuring device, and (C) a computer in which a plurality of paint blends, color data and micro-brilliance-feeling data corresponding to each of the paint blends, color characteristic data and micro-brilliance-feeling data for a plurality of full color paints are entered and a color-matching-calculation logic using the paint blends and the data operates to execute:

(1) a step of measuring a paint film of a reference color to which a paint color should be adjusted through color-matching by a calorimeter to obtain color data of the reference color;

(2) a step of measuring a paint film of the reference color to which a paint color should be adjusted through color-matching by a micro-brilliance-feeling measuring device to obtain micro-brilliance-feeling data of the reference color; and (3) a step of comparing the color data and micro-brilliance-feeling data of the reference color with color data and micro-brilliance-feeling data corresponding to the paint blends previously entered in the computer, indexing the degree of matching of the color and micro-brilliance feeling of the entered paint blends, and selecting a prospective paint blend.

Moreover, the present invention provides the above computer color-matching method for executing (4) a step of correcting the selected prospective paint blend by using a color-matching-calculation logic and obtaining a corrected blend closer to the reference color after the above step (3).

Furthermore, the present invention provides the above computer color-matching method for transferring a prospective paint blend obtained in step (3) or a corrected blend obtained in step (4) to an electronic balance.

Furthermore, the present invention executes the following steps (5) to (7) by using a computer color-matching apparatus constituted of (A) a colorimeter, (B) a micro-brilliance-feeling measuring device, and (C) a computer in which a plurality of color numbers, paint blends corresponding to the color numbers, color data and micro-brilliance-feeling data corresponding to the color blends, and color characteristic data and micro-brilliance-feeling data of a plurality of full color paints and a color-matching-calculation logic using the paint blends and the data operates to execute:

(5) a step of measuring a paint film of a reference color to which a paint color should be adjusted through color-matching by a colorimeter and obtaining the color data of the reference color;

(6) a step of measuring a paint film of the reference color to which the paint color should be adjusted through color-matching by a micro-brilliance-feeling measuring device to obtain the micro-brilliance-feeling data of the reference color; and (7) a step of selecting color data and micro-brilliance-feeling data of at least one paint blend having the same color number as the preset color number of the reference color, comparing the color data and micro-brilliance-feeling data of the selected paint blend with the color data and micro-brilliance-feeling data of the reference color, indexing the degree of matching of the color and micro-brilliance feeling of the selected paint blend, and selecting a prospective paint blend.

Furthermore, the present invention provides the above computer color-matching method for further executing (8) a step of correcting the selected prospective paint blend by using a color-matching-calculation logic and obtaining a corrected paint blend closer to the reference color after the above step (7).

Furthermore, the present invention provides the above computer color-matching method for transferring the prospective paint blend obtained in the above step (7) or the corrected paint blend obtained in step (8) to an electronic balance.

An apparatus and a method of the present invention are described below in detail.

DESCRIPTION OF THE EMBODIMENT

Figure 1:
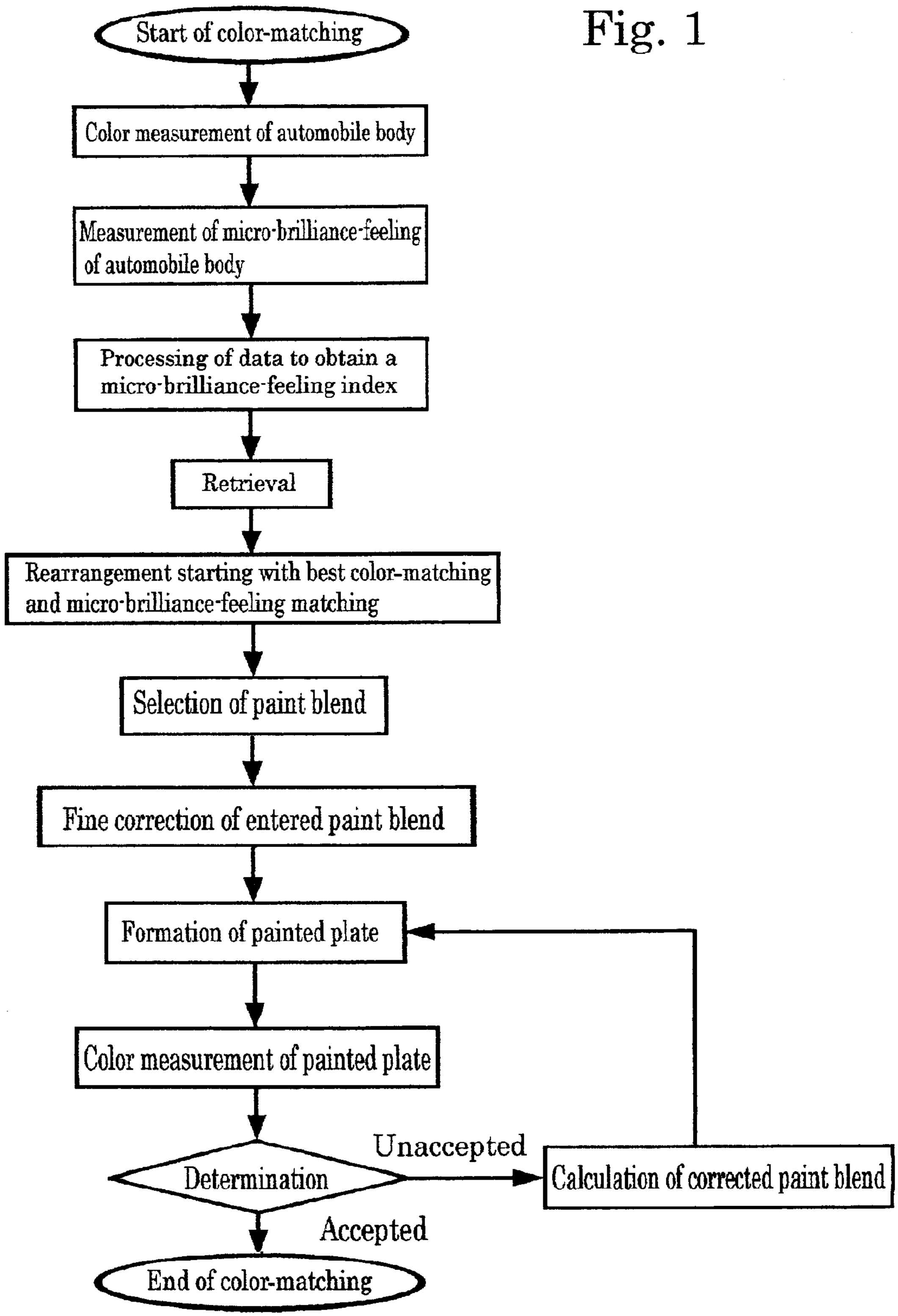
FIG. 1 is a process diagram showing a paint color-matching method of the present invention.

First, a computer color-matching apparatus for paints of the present invention is described below.

The apparatus of the present invention makes it possible to preferably perform color-matching when a paint film whose color should be adjusted through color-matching is a paint film having a brilliance feeling (may be hereafter referred to as "brilliant paint film").

The above brilliant paint film can be one of the following films: (1) a single-layer paint film containing brilliant pigments having brilliance feeling and interference action such as scaly aluminum powder, micaceous iron oxide, mica powder, and metal-oxide-covered mica powder, (2) a single-layer paint film containing these brilliant pigments and coloring pigments in the same paint film, (3) a multilayer paint film formed by superposing the single-layer paint film (1) or (2) on a coloring-base paint film, and (4) a multilayer paint film formed by further superposing a clear paint film on the surface of the single-layer paint film (1) or (2), or on the surface of the multi-layer paint film (3).

A computer color-matching apparatus of the present invention comprises a colorimeter (A), a micro-brilliance-feeling measuring device (B) and a computer (C).

Colorimeter (A)

The calorimeter (A) is a device for measuring the color of a paint film and obtaining color data of the paint film and it is possible to use any already-known colorimeter as long as the calorimeter can achieve the above object.

A multiangle colorimeter whose measuring angle is multiangle is preferable as the above colorimeter. The multiangle colorimeter measures colors under two angle conditions or more, normally two to four angle conditions, that is, two or more conditions in which light incident angles are different from each other or light-receiving angles are different from each other. The light-receiving angle is an angle formed between a mirror-reflection axis and a light-receiving axis. The mirror-reflection axis denotes an axis for forming a reflection angle when an incident angle is equal to the reflection angle, that is, an axis in which a reflection angle is 45° when an incident angle is 45°.

To change light-receiving angles, light-receiving-angle conditions are not restricted. It is preferable that the light-receiving angles are kept at one of 15° to 30° and one of 75° to 110° when two angle conditions are used, the light-receiving angles are kept at one of 15° to 30°, one of 35° to 60°, and one of 75° to 110° when three angle conditions are used, and the light-receiving angles are kept at one of 15° to 30°, one of 35° to 60°, one of 70° to 80°, and one of 90° to 110° when four angle conditions are used, because it is easy to correspond to visual color determination.

Each measured value (angle criterion measured value) obtained by measuring the color of the above paint film in accordance with each angle condition is permitted as long as the measured value can specify a color such as capable of showing or calculating lightness (value), chroma, and hue. For example, the measured value can be shown by an XYZ color system (X, Y, Z), L*a*b* color system (L*, a*, and b* values), Hunter Lab color system (L, a, and b values), L*C*h color system (L*, C*, and h value) prescribed in CIE (1994), or Mun-sell color system (H, V, and C). Particularly, indication by the L*a*b* color system or L*C*h color system is generally used to indicate a color in the industrial field including the automobile refinish painting field.

Micro-brilliance-feeling Measuring Device (B)

The micro-brilliance-feeling measuring device (B) is a device for measuring the micro brilliance of a brilliant paint film and it is possible to use any device as long as it can achieve the above object.

The micro-brilliance-feeling measuring device (B) can be a micro-brilliance-feeling measuring device provided with a light-irradiation device for irradiating light to a brilliant paint film surface, a CCD camera for photographing a light-irradiated paint film surface at an angle at which irradiated light does not come in directly to form an image, and an image analyzer for analyzing the image connected to the CCD camera.

To measure the micro-brilliance feeling of a brilliant paint film by the above micro-brilliance-feeling measuring device, light is first irradiated to a brilliant paint film surface. It is preferable to use dummy (artificial) sunlight as the above light and a halogen lamp or metal-halide lamp is suitable for the light source of the dummy sunlight. A light irradiation angle to the brilliant paint film surface normally uses 5° to 60° in accordance with the plumb line of a paint surface, preferably uses a range of 10° to 20°, and most preferably uses approximately 15° from the plumb line. Moreover, though the shape of a light irradiation area is not restricted, it is generally circular. It is preferable to set a light irradiation area on a paint film surface to a range of 1 to 10,000 $mm^2$ but the area is not restricted to this range. It is preferable to set the illuminance of irradiation light in a range of 100 to 2,000 lux.

Thus, light is irradiated on the brilliant paint film surface and the paint film surface on which the light is irradiated is photographed by a CCD (Charge Coupled Device) camera at an angle at which regular-reflection light of the total refraction light of the irradiation light does not come in. Though it is preferable that the photographing angle is equal to an angle at which regular-reflection light does not come in, the plumb direction to a paint film surface is particularly preferable. Moreover, it is preferable that the angle between the photographing direction by the CCD camera and the direction of the regular-reflection light is kept in a range of 10° to 60°. A measuring area by the CCD camera on the light-irradiated paint film surface is not restricted as long as the measuring area is an area on which light is uniformly irradiated. However, it is preferable that a measuring area is kept in a range of 1 to 10,000 $mm^2$ and more preferable that the area is kept in a range of 10 to 600 $mm^2$ including the central portion of the irradiated portion.

An image photographed by the CCD camera is a two-dimensional image which is divided into many partitions (pixels) (generally, 10,000 to 1,000,000 partitions) and the brightness of each partition is measured. In the present invention, "brightness" denotes a "digital gradation showing the shading value of a two-dimensional image photographed by a CCD camera for each partition and a digital value corresponding to the brightness of an object". The digital gradation representing the brightness for each partition output from a CCD camera having an 8-bit resolution shows values of 0 to 255.

In the case of a two-dimensional image photographed by the above CCD camera, a partition of the image corresponding to a portion having a strong reflection light of a brilliant pigment has a high brightness because the portion has a strong glitter feeling and a partition corresponding to a portion having a weak reflection light of the pigment naturally has a low brightness. Moreover, even in the case of a partition corresponding to a portion having a strong reflection light of a brilliant pigment, the brightness changes depending on the size, shape, angle, or material of the pigment. That is, the present invention makes it possible to display the brightness for each partition and three-dimensionally display the brightness distribution of a two-dimensional image photographed by a CCD camera in accordance with the brightness of each partition. The three-dimensional brightness distribution map is divided into crest, trough, and flat portions, in which the height or size of a crest shows a brilliance-feeling degree of a brilliant pigment. A brilliance feeling becomes more remarkable as the crest becomes higher, and trough and flat portions show that there is no brilliance feeling or there is a weak brilliance feeling and mainly show reflection of light by a coloring pigment or substrate.

An image photographed by the above CCD camera can be analyzed by an image analyzer connected to the CCD camera. It is preferable to use "Mac SCOPE" (trade name) of MITANI CORPORATION as the image-analyzing software used for the image analyzer.

In the case of image analysis, it is preferable to separately quantitatively evaluate "glitter feeling" (perception of irregular minute brilliance produced by the light regularly reflected from a brilliant pigment in a paint film) and "particle feeling" {irregular non-oriented pattern (random pattern) caused by orientation or overlap of a brilliant pigment in a paint film containing a brilliant material} when observing a sample under a lighting condition in which a brilliance feeling does not easily occur because the fluctuation due to individual difference is small.

A preferred method for measuring a brilliance feeling can be the following measuring method.

A two-dimensional image obtained by photographing a brilliant paint film surface irradiated with light by a CCD camera is divided into a lot of partitions, the total sum is obtained by totaling brightnesses of all partitions, an average brightness x is obtained by dividing the total sum by the total number of partitions, and a threshold $\alpha$ is set to a value of the average brightness x or more. It is generally proper that the threshold a is the sum of the average brightness x and y (y is generally set to a value between 24 and 40, preferably set to a value between 28 and 36, and more preferably set to 32).

Then, the value of the threshold $\alpha$ is subtracted from the brightness of each of the above partitions and positive subtraction values are totaled to obtain the total volume V that is the total sum of the subtraction values. Moreover, the total area S is obtained which is the total number of partitions respectively having a brightness of the threshold $\alpha$ or more (the total number of partitions respectively having the threshold $\alpha$ or more obtained by performing binarization with the threshold $\alpha$). The brightness-peak average height PHav$\alpha$ is set to a value three times larger than a value obtained by dividing the total volume V by the total area S, that is, a value obtained from the following expression because it is estimated that a brightness peak can be approximated to a cone or pyramid.

$$PHv\alpha=3V/S$$

Moreover, a threshold $\beta$ is set which is the average brightness x or more but the threshold $\alpha$ or less. It is proper that the threshold $\beta$ is equal to or less than the threshold a and equal to the sum of the average brightness x and z (z is generally set to a value between 16 and 32, preferably set to a value between 20 and 28, and more preferably set to 24).

Then, the value of the threshold $\beta$ is subtracted from the brightness of each of the partitions and positive subtraction values are totaled to obtain the total volume W which is the total sum of the subtraction values. Moreover, the total area A is obtained which is the total number of partitions respectively having a brightness of the threshold $\beta$ or more (total number of partitions of the threshold $\beta$ or more obtained by performing binarization with the threshold $\beta$). The average height PHav$\beta$ of brightness peaks at the threshold $\beta$ can be set to a value three times larger than a value obtained by dividing the total volume W by the total area A, that is, a value obtained from the following expression because it is estimated the height PHav$\beta$ can be approximated to a cone or pyramid:

$$PHav\beta=3W/A$$

Moreover, it is possible to obtain the average particle area of optical particles from the total area A at the threshold $\beta$ and the number of optical particles C showing the brightness equal to or more than the threshold $\beta$. In the present invention, "optical particle" denotes an "independent continuum having a brightness equal to or more than a threshold on a two-dimensional image". When assuming the shape of the above optical particle as a circle, the diameter D of a circle having an area equal to an average particle area is obtained from the following expression.

$$D=\sqrt{(4A/\pi C)}$$

Moreover, the average bottom broadening rate PSav of brightness peaks is obtained from the above PHavβ and D in accordance with the following expression.

ti $PSav=D/PHav\beta$

A brilliance value BV can be approximately calculated by using the brightness-peak average height PHavα obtained as previously described and the average bottom broadening rate PSav of brightness peaks obtained as described above in accordance with the following expression {in the following expression, a is equal to 300 when PHavα is less than 25, equal to 1,050 when PHavα exceeds 45, and equal to a value shown by the expression a=300+37.5×(PHavα-25) when PHavα is equal to a value between 25 and 45}.

$$BV=PHav\alpha+a\cdot PSav$$

In the preferred method of the present invention, it is possible to quantitatively measure the "glitter feeling" of a brilliant paint film in accordance with the brilliance value BV obtained as described above and the correlation between the brilliance value BV and a sensory-evaluation result of "glitter feeling" through visual observation is high when the density difference and lightness difference of a brilliant material of a paint film are large.

Then, a preferred method for quantitatively measuring "particle feeling" is described below.

The above method for quantitatively measuring a particle feeling is a method of photographing the brilliant paint film surface irradiated with light by a CCD camera to obtain a two-dimensional image, obtaining a two-dimensional power-spectrum integral value obtained by integrating the power of a low-spatial-frequency component in accordance with a spatial frequency spectrum constituted by two-dimensional-Fourier-transforming the two-dimensional image and normalizing the power with a DC component, and quantitatively evaluating the particle feeling of a paint film in accordance with the two-dimensional power-spectrum integral value.

To measure a two-dimensional power-spectrum integral value obtained by extracting a low-spatial-frequency component from an image of a spatial frequency spectrum after two-dimensional-Fourier-transformed, integrating the low-spatial-frequency component and normalizing the component with a DC component, it is proper from the viewpoint of improving the correlation with a sensory evaluation result of "particle feeling" through visual observation to bring an extraction area for a low spatial frequency component extracted from an image of a spatial frequency spectrum into an area in which a linear density showing a resolution is set to any value in a range between a lower limit value of 0 line/mm and an upper limit value of 2–13.4 lines/mm, preferably between a lower limit value of 0 line/mm and an upper limit value of 4.4 lines/mm. The particle feeling becomes stronger as a two-dimensional power-spectrum integral value increases.

A two-dimensional power-spectrum integral value (may be hereafter referred to as "IPSL") can be obtained by the following expression.

$$\text{Two-dimensional power-spectrum integral value}=\frac{\int_0^L\int_0^{2\pi}P(\upsilon,\theta)d\upsilon d\theta}{P(O,O)}$$

(In the above expression, v denotes a spatial frequency, θ denotes an angle, P denotes a power spectrum, 0 to L denote extracted low-spatial-frequency areas, and L denotes the upper limit of an extracted frequency.)

Moreover, it is possible to evaluate "brilliance feeling" in accordance with an MBV value obtained from the following primary expression on the basis of the above brilliance value BV.

$$MBV=(BV-50)/2$$

The MBV value shows an object having no glitter feeling as 0 and an object having the strongest glitter feeling as about 100. An object having stronger "glitter feeling" shows a larger value.

Moreover, it is possible to evaluate "particle feeling" in accordance with an MGR value obtained from the following primary expression on the basis of the above two-dimensional power-spectrum integral value (IPSL).

When the IPSL value is equal to or more than 0.32,MGR is shown by the following expression.

$$MGR=[(IPSL\times1000)-285]/2$$

When the IPSL value is kept in a range of 0.15<IPSL<0.32, MGR is shown by the following expression.

$$MGR=[IPSL\times(35/0.17)-(525/17)]/2$$

When the IPSL value is equal to or less than 0.15, MGR is shown by the following expression.

MRG=0

The above MGR value shows an object having no brilliant-material particle feeling as 0 and an object having the highest brilliant-material particle feeling as about 100. Therefore, an object having higher "particle feeling" shows a larger value.

Moreover, it is possible to evaluate a micro-brilliance feeling in accordance with a value (micro-brilliance-feeling index) obtained by indexing a micro-brilliance feeling calculated by the following expression synthetically showing a micro-brilliance feeling in accordance with the above MBV and MGR values.

$$\text{Micro-brilliance-feeling index}=(MGR+\alpha\cdot MBV)/(1+\alpha)$$

As a result of studying many paint plates respectively having a brilliance feeling, it is found that a result well-matching with a micro-brilliance feeling through visual observation can be obtained by setting the above a value to 1.63. The micro-brilliance-feeling index is a value showing an object having no brilliance feeling (object having no glitter or particle feeling) as 0 and an object having the strongest brilliance feeling (object having the strongest glitter and particle feelings) as approximately 100.

Computer (C)

The computer (C) stores a plurality of paint blends, color data and micro-brilliance data corresponding to each paint blend, color characteristic data and micro-brilliance-feeling characteristic data of a plurality of full-color paints, and according to necessity, a plurality of color numbers and paint blends corresponding to the color numbers, in which a color-matching-calculation logic using the paint blends and the data operates.

The color data corresponding to each paint blend entered in a computer can be the color-measurement data obtained by a multiangle calorimeter of a paint film obtained from each paint.

The color characteristic data of a full-color paint entered in a computer can be a K-value (light absorbing coefficient) and an S-value (light-scattering coefficient) of a full-color paint. The above K-value and S-value can be obtained by numerically processing color-measurement data of a full-color paint and a diluted color of the full-color paint.

The above color number entered in a computer according to necessity is generally a color code number designated for each painted product maker and a paint blend for refinish paint in accordance with the color number is entered in the computer. The paint blend can be only one or only one set for one color number. However, a past-record blend can also be included and it is permitted that a plurality of blends or a plurality of sets of blends are entered. The color-measurement data of the formed paint film obtained from a multiangle colorimeter is previously entered in the computer.

Then, a computer color-matching method of the present invention using a computer color-matching apparatus of the present invention is described below.

A computer color-matching method of the present invention includes two aspects such as a first color-matching method of excluding a step of selecting a paint blend out of the same color numbers by using a color number and a second color-matching method of including a step of selecting a paint blend out of the same color numbers by using a color number.

First, the first color-matching method is described below in accordance with steps in order.

Step (1)

Step (1) is a step of measuring a paint film of a reference color to which a paint color should be adjusted through color-matching by the colorimeter (A) and obtaining the color data of the reference color.

It is preferable to measure the reference color which is the color of a paint film to which a paint color should be adjusted by the multiangle colorimeter and obtain the color data under the angle condition. When forming a refinish paint film in refinish painting of an automobile, it is necessary that the difference between the paint-film color of a refinish paint portion and the paint-film color nearby the refinish paint portion cannot be easily recognized through visual observation. Therefore, it is preferable that the above reference color is the same as the color of a paint film nearby the refinish paint portion.

Step (2)

Step (2) is a step of measuring a paint film of the above reference color by the micro-brilliance-feeling measuring device (B) and obtaining the micro-brilliance-feeling data of the reference color.

As the micro-brilliance-feeling measuring device (B), as described above, it is preferable to use a measuring device provided with a light-irradiation device, a CCD camera for forming an image by photographing a paint-film surface irradiated with light at an angle at which irradiation light does not come in directly, and an image analyzer for analyzing the image connected to the CCD camera.

Moreover, as described above, it is preferable to quantitatively evaluate the micro-brilliance feeling of the reference color by dividing the feeling into "glitter feeling" and "particle feeling" and obtain each data.

Step (3)

In step (3), color data of the reference color obtained in the above step (1) and micro-brilliance-feeling data of the reference color obtained in the above step (2) are compared with the color data and micro-brilliance-feeling data corresponding to a paint blend previously entered in a computer by the computer to index the degree of matching of the color and micro-brilliance feeling of the entered paint blend and select a prospective paint blend. It is possible to properly select a most-rational prospective paint blend by considering the degree of matching of color and micro-brilliance feeling with the reference color and paint blend data. The method for selecting a most-rational prospective paint blend is not restricted. It is preferable to select a prospective paint blend out of blends each of whose degree of matching of color difference and micro-brilliance feeling with the reference color is kept in a proper range.

Though the first color-matching method has the above steps (1), (2), and (3) as indispensable steps, it is permitted to execute the following step (4) after step (3) in order to make a color approach to the reference color.

Step (4)

This is a step of obtaining a corrected blend closer to the reference color by using a computer in which a plurality of paint blends, the color data and micro-brilliance-feeling data corresponding to each of the paint blends, and the color characteristic data and micro-brilliance-feeling characteristic data of a plurality of full-color paints are entered and thereby, operating a color-matching-calculation logic using the paint blends and the data, and correcting the prospective paint blend selected in step (3).

It is permitted that the first color-matching method further comprises a step of transferring the prospective paint blend obtained in the above step (3) or the corrected paint blend obtained in step (4) to an electronic balance.

Then, the second color-matching method is described below.

In the case of the second color-matching method, data including a plurality of color numbers and paint blends corresponding to the color numbers are used in addition to the data entered in a computer used for the above first color-matching method to execute the following steps (5) to (7).

Step (5)

Step (5) is the same step as step (1) in the first color-matching method.

Step (6)

Step (6) is the same step as step (2) in the first color-matching method.

Step (7)

In step (7), the color data and micro-brilliance-feeling data of at least one paint blend having the same color number as that of the reference color are selected out of the color numbers previously entered in a computer, the color data and micro-brilliance-feeling data of the selected paint blend are compared with the color data and micro-brilliance-feeling data of the reference color, degrees of matching between colors and between micro-brilliance feelings of the selected paint blend are indexed, and a prospective paint blend is selected. It is possible to properly select a most rational prospective paint blend by considering the degree of matching of a color and micro-brilliance feeling with the reference color and blend data. This selection method is not restricted.

The second color-matching method uses the above steps (5), (6), and (7) as indispensable steps. However, it is permitted to execute the following step (8) after step (7) in order to make a color closer to the reference color.

Step (8)

Step (8) is the same as step (4) in the first color-matching method, in which a color-matching-calculation logic is operated to correct the prospective paint blend selected in step (7) and obtain a corrected blend closer to the reference color.

It is permitted that the second color-matching method further comprises a step of transferring the prospective paint blend obtained in the above step (7) or the corrected blend obtained in step (8) to an electronic balance.

In the case of the first and second color-matching methods, it is possible to transfer a paint blend to an electronic balance through a telephone line or optical cable. It is possible to obtain a color-matched paint by blending through an electronic balance in accordance with the transferred blend. A color-matched painted plate is obtained by painting the color-matched paint to a substrate, it is possible to determine whether the paint is acceptable. When the paint is unacceptable, it is possible to obtain a corrected blend again by operating a color-matching-calculation logic in accordance with the paint blend of the color-matched paint and the color data and micro-brilliance-feeling data of the color-matched painted plate.

FIG. 1 is a process chart showing a paint color-matching method for refinishing a brilliant paint film of an automobile body.

DESCRIPTION OF THE EXAMPLE

Hereafter, the present invention is further specifically described by referring to embodiments. However, the present invention is not restricted to the embodiments.

Apparatus Used and Measuring Method

In the case of each embodiment below, a reference color to which a paint color should be adjusted through color-matching was measured by the multiangle colorimeter "Van-Van FA Sensor" made by KANSAI PAINT CO., LTD. and the computer color-matching apparatus made by KANSAI PAINT CO., LTD. was used for a computer in which color characteristic data and micro-brilliance-feeling data of a plurality of full-color paints are entered and a color-matching-calculation logic using the paint blends and the data operates. The above "Van-Van FA sensor" makes it possible to obtain color-measurement values through measurement at three angles of 25°, 45°, and 75° formed between a mirror-reflection axis and a light-receiving axis. Moreover, the micro-brilliance-feeling data of the reference color to which a paint color should be adjusted through color-matching was obtained by a CCD camera constituted by setting an AF macro 100-mm F2.8 lens to "RD-175" made by MINOLTA CO., LTD. and lighting was performed by an optical-fiber-type halogen light to whose front end a condenser lens is set. A photographed image was cut out to digital image data in which the original image data has 256 monochrome gradations of 512×512 pixels on the computer and digital-processed by image analysis software.

Embodiment 1:

The reference color of the paint-film surface of an automobile body having a silver metallic paint color ("SM-001"; tentative name) was measured at three angles of 25°, 45°, and 75° by the "Van-Van FA sensor". Table 1 shows the measurement results.

TABLE 1

| | L* | a* | b* |
|---|---|---|---|
| 25° | 96.36 | −1.61 | −1.26 |
| 45° | 72.14 | −1.46 | −2.50 |
| 75° | 50.33 | −1.41 | −2.64 |

Moreover, micro-brilliance feeling was measured and a micro-brilliance-feeling index based on [(MGR+1.63 MBV)/2.63] was obtained as 54.25.

As a result of retrieving the blend of the entered paint color name of "SM-001" by "Van-Van FA station", 30 paint blends were selected. Then, these paint blends were arranged in order starting with a paint blend having the best degrees of color-matching and micro-brilliance-feeling matching in accordance with a value obtained by indexing the degree of color-matching and a micro-brilliance-feeling index. Because a paint blend having the combination between best degrees of color-matching and micro-brilliance matching ("SM-001CK01") was not expensive but rational, the blend of "MS-001CK01" was selected as a prospective paint blend. Moreover, a paint blend "SM-001CK07" which is the best combination as a result of retrieving combinations by using only a value obtained by indexing the degree of color-matching, was also studied for color-matching.

Computer color-matching was performed by using the "Van-Van FA station" in accordance with the entered paint blends of the "SM-001CK01" and "SM-001CK07" to obtain a paint blend. Table 2 shows paint blends based on the "SM-001CK01" and Table 3 shows paint blends based on the "SM-001CK07".

TABLE 2

| Full-color paint species | Blending quantity (Part by weight) |
|---|---|
| Silver A (Metallic full color A) | 64.38 |
| Silver B (Metallic full color B) | 6.50 |
| Blue A (Blue full color A) | 0.32 |
| Black A (Black full color A) | 0.26 |
| Auxiliary agent A (Aluminum-oriented adjuster A) | 18.79 |
| Auxiliary agent B (Aluminum-oriented adjuster B) | 9.75 |

TABLE 3

| Full-color paint species | Bending quantity (Part by weight) |
|---|---|
| Silver A (Metallic full color A) | 47.13 |
| Silver C (Metallic full color C) | 42.08 |
| White A (White full color A) | 5.02 |
| Yellow A (Yellow full color A) | 1.94 |
| Blue B (Blue full color B) | 0.25 |
| Blue C (Blue full color C) | 0.21 |
| Auxiliary agent B (Aluminum-oriented adjuster A) | 3.37 |

Then, paints of the above blends were applied onto a tin plate and set and thereafter, the refinishing clear paint "RETAN PG2K Clear" made by KANSAI PAINT CO., LTD. was applied onto the paint film up to a film thickness of 50 μm, and then baked for 20 min at 60° C. to form a color-matched paint plate. Colors of the paint plate were measured by the "Van-Van FA sensor" at the above three angles to calculate color differences. Moreover, micro-brilliance feeling was measured to calculate a micro-brilliance-feeling index.

The "SM-001CK01" has a micro-brilliance-feeling index of 54.94 and color measurement results at three angles are shown in Table 4 below.

TABLE 4

| | ΔL* | Δa* | Δb* | ΔE* |
|---|---|---|---|---|
| 25° | 3.78 | −0.18 | −0.06 | 3.78 |
| 45° | 3.23 | −0.25 | −0.05 | 3.24 |
| 75° | 2.14 | −0.26 | −0.48 | 2.21 |

The "SM-001CK07" has a micro-brilliance-feeling index of 47.71 and color measurement results at three angles are shown in Table 5 below.

TABLE 5

| | ΔL* | Δa* | Δb* | ΔE* |
|---|---|---|---|---|
| 25° | −0.14 | −0.24 | −0.56 | 0.62 |
| 45° | −0.52 | −0.21 | −0.08 | 0.56 |
| 75° | 0.79 | −0.32 | −0.02 | 0.86 |

The paint color of the color-matched painted plate based on the "SM-001CK01" was not accepted because it was slightly different from the reference color. However, the micro-brilliance-feeling index showed a value almost equal to the case of the reference color and the micro-brilliance feeling of aluminum powder serving as a brilliant material was matched through visual observation. The paint color of a color-matched painted plate based on the "SM-001CK07" was not accepted because the micro-brilliance feeling of aluminum powder was considerably different from the reference color though the color difference from the reference color was small. In general, when a micro-brilliance-feeling index differs by 2 to 3, it is possible to recognize a difference in the glitter feeling and/or particle feeling of a brilliant material through visual observation.

Therefore, a corrected blend was obtained by reading the color-measurement data of the color-matched painted plate and performing fine color-matching calculation by the "Van-Van FA station" and a computer. The corrected blend based on the "SM001CK01" was a blend obtained by adding-a full-color paints shown in Table 6 below to the paint blends shown in Table 2. In the case of the "SM-001CK07", it was impossible to calculate a corrected blend because the color difference was small, codes of ΔL* of 25° and 75° were inverted, and the color difference was not attenuated even after the corrected-blend calculation in fine color-matching was performed.

TABLE 6

| Full-color paint species | Blending quantity (Part by weight) |
|---|---|
| Blue A (Blue full color A) | 0.05 |
| Black A (Black full color A) | 0.11 |

A color-matched paint plate was formed by performing color-matching with a corrected blend based on the above "SM-001CK012", applying the paint of the above blend to a tin plate, setting it, and thereafter applying a clear paint onto the paint film and baking the plate. Colors of the paint plate were measured by the "Van-Van FA sensor" at the above three angles to calculate a color difference. Table 7 shows the color-measured results and the results are close to the color-measurement value of the reference color.

TABLE 7

| | ΔL* | Δa* | Δb* | ΔE* |
|---|---|---|---|---|
| 25° | 1.24 | −0.07 | −0.21 | 1.26 |
| 45° | 0.98 | −0.11 | −0.15 | 1.00 |
| 75° | 0.58 | −0.17 | −0.08 | 0.61 |

The micro-brilliance-feeling index of the painted plate was equal to 54.78. Moreover, the paint plate was preferable because colors and micro-brilliance feeling of the plate well matched with a those of the reference color through visual evaluation. Therefore, the plate was accepted. Thus, as a result of applying the actually-color-matched paint to an automobile body for refinish and visually performing the color-matching determination for the paint-film surfaces of the refinished paint portion and its vicinity of the automobile body, preferable color-matching was confirmed.

Embodiment 2:

The reference color of the paint film surface of an automobile body coated with a red pearl paint color ("RP-002"; tentative name) was measured by the "Van-Van FA sensor" at three angles of 25°, 45°, and 75°. Table 8 shows the results.

TABLE 8

| | L* | a* | b* |
|---|---|---|---|
| 25° | 21.48 | 37.34 | 13.43 |
| 45° | 14.66 | 31.55 | 14.27 |
| 75° | 11.34 | 28.00 | 11.89 |

Moreover, micro-brilliance feeling was measured and as a result of calculating the micro-brilliance-feeling index, a value of 28.14 was obtained.

As a result of retrieving blends of entered paint color names of the "RP-002" by the "Van-Van FA station", 13 paint blends were selected. Then, these blends were rearranged in order starting with a blend having the best degrees of color-matching and micro-brilliance-feeling matching in accordance with a value obtained by indexing the degree of color-matching and a micro-brilliance-feeling index. The paint blend of the combination ("RP-002CK01") of the best degrees of color-matching and micro-brilliance-feeling matching was not expensive but rational. Therefore, the blend of the "RP-002CK01" was selected as a prospective paint blend. Moreover, a paint blend "RP-002CK12" which is the best combination as a result of retrieving the blends by using only a value obtained by indexing the degree of color-matching, was also studied for color-matching.

Computer color-matching was performed by using the "Van-Van FA station" in accordance with the entered paint blends of the "RP-002CK01" and "RP002CK12" and a paint blend was obtained. Table 9 shows the paint blend based on the "RP-002CK01" Table 10 shows the paint blend based on the "RP-002CK12".

TABLE 9

| Full-color paint species | Blending quantity (Part by weight) |
|---|---|
| Red A (Red full color A) | 31.85 |
| Red B (Red full color B) | 30.25 |
| Red C (Red full color C) | 25.48 |
| Pearl A (Pearl full color A) | 6.37 |

TABLE 9-continued

| Full-color paint species | Blending quantity (Part by weight) |
|---|---|
| Pearl B (Pearl full color B) | 3.18 |
| Black A (Black full color A) | 2.87 |

TABLE 10

| Full-color paint species | Blending quantity (Part by weight) |
|---|---|
| Red A (Red full color A) | 60.01 |
| Red B (Red full color B) | 23.33 |
| Pearl B (Pearl full color B) | 13.00 |
| Black A (Black full color B) | 3.33 |
| White A (White full color C) | 0.33 |

Then, paints of the above blends were applied onto a tin plate and set and then, the refinishing clear paint "RETAN PG2K Clear" was applied onto the paint films up to a film thickness of approximately 50 μm, thereafter baked for 20 min at 60° C. to form color-matched painted plates. Colors of these paint plates were measured by the "Van-Van FA sensor" at the above three angles to calculate a color difference. Moreover, micro-brilliance feeling was measured to calculate a micro-brilliance-feeling index.

A paint plate based on the "RP-002CK01" showed a micro-brilliance-feeling index of 26.36. Table 11 shows color-measurement results at three angles. A paint plate based on the "RP-002CK12" showed a micro-brilliance-feeling index of 10.82. Table 12 shows color-measurement results at three angles.

TABLE 11

| | ΔL* | Δa* | Δb* | ΔE* |
|---|---|---|---|---|
| 25° | 1.05 | 2.70 | 0.00 | 2.90 |
| 45° | 0.65 | 1.75 | −0.96 | 2.10 |
| 75° | 0.16 | 1.28 | −0.54 | 1.40 |

TABLE 12

| | ΔL* | Δa* | Δb* | ΔE* |
|---|---|---|---|---|
| 25° | 0.29 | −0.15 | −0.34 | 0.47 |
| 45° | 0.19 | −0.24 | −0.27 | 0.41 |
| 75° | 0.19 | −0.40 | −0.08 | 0.45 |

The paint color of the color-matched painted plate based on the "RP002CK01"was not accepted because it was slightly separate different from the reference color. However, the micro-brilliance-feeling index showed a value almost equal to that of the reference color and the micro-brilliance feeling of a pearl pigment (brilliant mica powder) serving as a brilliant pearl pigment matched with that of the reference color through visual observation. The paint color of the color-matched painted plate based on the "RP-002CK12" was not accepted because the micro-brilliance-feeling was considerably different from that of the reference color though the color difference from the reference color was small.

Therefore, a corrected blend was obtained by reading color-measurement data of the color-matched painted plate and performing fine colorimetric calculation by the "Van-Van FA station" and a computer. The corrected blend based on the "RP-002CK01" was a blend obtained by adding predetermined amounts of full-color paints shown in Table 13 to the paint blend shown in Table 9. Moreover, in the case of the color-matched painted plate based on the "RP-002CK12", it was impossible to perform a corrected blend calculation for attenuating color differences at three angles in a good balance because the color differences at three angles were too small.

TABLE 13

| Full-color paint species | Blending quantity (Part by weight) |
|---|---|
| Pearl A (Pearl full color A) | 2.46 |
| Pearl B (Pearl full color B) | 1.23 |

A color-matched paint plate was formed by performing color-matching with the corrected blend based on the above "RP-002CK01", applying the paint of the above blend to a tin plate and setting it, and then applying the clear paint onto the paint film and baking the plate similarly to the above described case. Colors of the paint plate were measured by the "Van-Van FA sensor" at the above three angles to calculate a color difference. Table 14 shows the color-measurement results and the results were close to the color-measurement value of the reference color.

TABLE 14

| | ΔL* | Δa* | Δb* | ΔE* |
|---|---|---|---|---|
| 25° | 0.54 | 1.15 | −0.14 | 1.28 |
| 45° | 0.13 | 0.78 | −1.03 | 1.30 |
| 75° | −0.14 | 0.36 | −0.75 | 0.84 |

The micro-brilliance-feeling index of this painted plate showed 26.31. Moreover, because colors and micro-brilliance feeling of the painted plate matched well with the reference color through visual evaluation, the painted plate was accepted. Therefore, as a result of refinish-painting an automobile body with the actually-color-matched paint and visually performing the color-matching determination for the paint-film surfaces of the refinished paint portion and its vicinity of the automobile body, preferable color-matching was confirmed.

Embodiment 3:

The reference color of the paint-film surface of an automobile body coated with a silver metallic paint color having an unknown color number was measured by the "Van-Van FA sensor" at three angles of 25°, 45°, and 75°. Table 15 shows the results.

TABLE 15

| | ΔL* | a* | b* |
|---|---|---|---|
| 25° | 100.86 | −0.02 | 4.41 |
| 45° | 66.74 | −0.10 | −0.53 |
| 75° | 45.69 | −0.18 | −2.73 |

Micro-brilliance feeling was also measured and as a result of calculating a micro-brilliance-feeling index according to [(MGR+1.63MBV)/2.63], a value of 58.94 was obtained.

All blends of the silver metallic paint color were retrieved by the "Van-Van FA station" and rearranged in order starting with a blend having the best degree of color-matching and micro-brilliance-feeling matching in accordance with a value obtained by indexing a color-matching degree and a micro-brilliance-feeling index. The paint blend of the combination ("SM-002CK05) of the best degrees of color-matching and micro-brilliance-feeling matching was not expensive but rational. Therefore, the blend of "SM-002CK05" was selected as a prospective paint blend. Moreover, a paint blend "SM-003CK10" which is the best combination as a result of retrieving blends by using only a value obtained by indexing a color-matching degree, was also studied for color-matching.

Computer color-matching was performed by the "Van-Van FA station" in accordance with entered paint blends of the "SM-002CK05" and "SM-003CK10" to obtain paint blends. Table 16 shows the paint blend based on the "SM-002CK05" below and Table 17 shows the paint blend based on the "SM-003CK10" below.

TABLE 16

| Full-color paint species | Blending quantity (Part by weight) |
|---|---|
| Sliver D (Metallic full color D) | 46.41 |
| Sliver A (Metallic full color A) | 16.57 |
| Pearl C (Pearl full color C) | 8.95 |
| Yellow A (Yellow full color A) | 4.97 |
| White B (Atomized white full color B) | 3.98 |
| Red D (Red full color D) | 0.23 |
| Auxiliary agent A (Aluminum-oriented adjuster A) | 15.58 |
| Auxiliary agent A (Aluminum-oriented adjuster B) | 3.31 |

TABLE 17

| Full-color paint species | Blending quantity (Part by weight) |
|---|---|
| Silver E (Metallic full color E) | 53.61 |
| Sliver F (Metallic full color F) | 25.53 |
| Silver G (Metallic full color G) | 20.06 |
| Black B (Black full color B) | 0.29 |
| Blue B (Blue full color B) | 0.22 |
| Red E (Red full color B) | 0.18 |
| White A (White full color A) | 0.11 |

Then, paints of the above blends were applied onto a tin plate and set and then, a refinishing clear paint "RETAN PG2K Clear" made by KANSAI PAINT CO., LTD. was applied onto the paint film up to a film thickness of approximately 50 $\mu$m and then, baked at 60° C. for 20 min to form a color-matched paint plate. Colors of the painted plate were measured by the "Van-Van FA sensor" at the above three angles to calculate a color difference. Moreover, micro-brilliance feeling was also measured to calculate a micro-brilliance-feeling index.

The "SM-002CK05" showed a micro-brilliance-feeling index of 57.38 and Table 18 shows color-measurement results at three angles below.

TABLE 18

| | ΔL* | Δa* | Δb* | ΔE* |
|---|---|---|---|---|
| 25° | 1.75 | −0.55 | 0.88 | 2.03 |
| 45° | 1.24 | −0.24 | 0.57 | 1.39 |
| 75° | 0.89 | 0.06 | 0.34 | 0.95 |

The "SM-003CK10" showed a micro-brilliance-feeling index of 64.08 and Table 19 shows color-measurement results at three angle below.

TABLE 19

| | ΔL* | Δa* | Δb* | ΔE* |
|---|---|---|---|---|
| 25° | 0.75 | −0.15 | −0.35 | 0.84 |
| 45° | 0.26 | −0.26 | −0.08 | 0.38 |
| 75° | −0.36 | 0.06 | 0.34 | 0.50 |

Paint color of the color-matched painter plate based on the "SM-002CK05" was not accepted because-they-were it was slightly-separate different from the reference color. However, the micro-brilliance-feeling index showed a value almost equal to that of the reference color and the micro-brilliance feeling of aluminum powder serving as a brilliant material was matched through visual observation. Paint colors of the color-matched painted plate based on the "SM-003CK10" were not accepted because the micro-brilliance feeling of aluminum powder was considerably separate different though the color difference from the reference color was small. Generally, when a micro-brilliance-feeling index differs by 2 to 3, it is possible to recognize a difference in glitter feeling and/or particle feeling of a brilliant material through visual observation.

Therefore, a corrected blend was obtained by reading the color-measurement data of the color-matched painted plate and performing fine color-matching calculation by the "Van-Van FA station". The corrected blend based on the "SM-002CK05" was a blend obtained by adding full-color paints shown in Table 20 to the paint blend shown in Table 16 by a predetermined quantity. In the case of the "SM-003CK10", it was impossible to perform the corrected-blend calculation of fine color-matching for attenuating a color difference at a preferable balance for three angles because the color difference between three angles was too small.

TABLE 20

| Full-color paint species | Blending quantity (Part by weight) |
|---|---|
| Red D (Red full color D) | 0.22 |
| White B (Atomized white full color A) | 0.46 |

Color-matching was performed with the corrected blend based on the "SM-002CK05", the paint of the above blend was applied onto a tin plate and set, and then the clear paint was applied onto the paint film and baked to form a color-matched paint plate similarly to the above case. Colors of the painted plate were measured by the "Van-Van FA sensor" at the above three angles to calculate color differences. Table 21 shows the color-measurement results and the results were close to the color-measurement value of the reference color.

TABLE 21

| | ΔL* | Δa* | Δb* | ΔE* |
|---|---|---|---|---|
| 25° | 0.56 | −0.12 | 0.31 | 0.65 |
| 45° | 0.21 | 0.04 | 0.07 | 0.22 |
| 75° | −0.13 | 0.15 | −0.08 | 0.21 |

The micro-brilliance-feeling index of the painted plate showed 56.98. Moreover, the painted plate was accepted because colors and micro-brilliance feeling of the paint plate well matched with the reference color through visual evaluation. Therefore, as a result of refinish-painting an automobile body with the actually color-matched paint and performing color-matching determination for paint film surfaces of the refinish-painted portion and its vicinity through visual observation, preferable color-matching was confirmed.

A method of the present invention makes it possible to accurately color-match brilliant paints, eliminate the fluctuation of the color-matching accuracy by a color-matching person, and make a color-matching person having less color-matching experience easily and accurately color-match paints.

What is claimed is:

1. A computer color-matching apparatus for paints comprising:

(A) a colorimeter, (B) a micro-brilliance-feeling measuring device, and (C) a computer in which a plurality of paint blends, color data and micro-brilliance-feeling data corresponding to each of the paint blends, and color characteristic data and micro-brilliance-feeling data of a plurality of full-color paints are entered, and in which a color-matching calculation logic using the paint blends and the data operates, wherein the micro-brilliance-feeling measuring device comprises:

a light irradiation device operable to irradiate light to a paint film surface;

a CCD camera operable to photograph the light-irradiated paint film surface; and an image analyzer operable to analyze an image photographed by the CCD camera, wherein the image photographed by the CCD camera is a two-dimensional image which is divided into a plurality partitions, wherein the micro-brilliance-feeling measuring device measures a brightness of each of the plurality of partitions, wherein the brightness is a digital gradation showing a shading value of the two-dimensional image photographed by the CCD camera for each partition, wherein the image analyzer separately and quantitatively evaluates a glitter feeling and a particle feeling of the two-dimensional image photographed by the CCD camera, wherein the glitter feeling is a perception of an irregular minute brilliance produced by light regularly reflected from a brilliant pigment in the paint film, and wherein the particle feeling is an irregular non-oriented pattern caused by an orientation or an overlap of a brilliant pigment in the paint film containing a brilliant material when observing a sample under a lighting condition in which a brilliance feeling does not easily occur, wherein a total sum of brightness is obtained by totaling the brightness of each of the plurality of partitions, wherein an average brightness is obtained by dividing the total sum of brightness by a total number of the plurality of partitions, wherein a threshold is set at a value which is at least the average brightness, wherein the glitter feeling is evaluated on the basis of a brightness whose value is at least the threshold, and wherein the particle feeling is evaluated by a two-dimensional power-spectrum integral value obtained by integrating the power of a low-spatial-frequency component in accordance with a spatial frequency spectrum constituted by two-dimensional-Fourier-transforming the two-dimensional image, and normalizing the power with a DC component, the two-dimensional image photographed by the CCD camera having been divided into the plurality of partitions.

2. The computer color-matching apparatus according to claim 1, wherein color numbers corresponding to the plurality of paint blends entered in the computer (C) are entered in the computer.

3. The computer color-matching apparatus according to claim 1, wherein the colorimeter (A) is a multiangle colorimeter.

4. The computer color-matching apparatus according to claim 2, wherein the colorimeter (A) is a multiangle colorimeter.

5. A computer color-matching method for brilliant paints which comprises executing the following steps (1) to (3):

(1) measuring a paint film of a reference color to which a color of a paint should be adjusted through color-matching by a colorimeter to obtain color data of the reference color;

(2) measuring the paint film of the reference color to which the color of the paint should be adjusted through color-matching by a micro-brilliance-feeling measuring device to obtain microbrilliance-feeling data of the reference color; and (3) comparing the color data and the micro-brilliance-feeling data of the reference color with color data and micro-brilliance-feeling data corresponding to paint blends previously entered in a computer, indexing the degree of matching of the color and micro-brilliance feeling of the entered paint blends, and selecting a prospective paint blend, wherein the method is performed by using a computer color-matching apparatus comprising: (A) the colorimeter, (B) the micro-brilliance-feeling measuring device, and (C) the computer in which a plurality of paint blends, color data and micro-brilliance-feeling data corresponding to each of the paint blends, and color characteristic data and micro-brilliance-feeling characteristic data of a plurality of full-color paints are entered, and in which a color-matching calculation logic using the paint blends and the data operates, wherein the micro-brilliance-feeling measuring device comprises:

a light irradiation device operable to irradiate light to a paint film surface;

a CCD camera operable to photograph the light-irradiated paint film surface; and an image analyzer operable to analyze an image photographed by the CCD camera, wherein the micro-brilliance-feeling device obtains a two-dimensional image of the paint film surface by the CCD camera, divides the two-dimensional image into a plurality of partitions, and measures a brightness of each of the plurality of partitions, wherein the brightness is a digital gradation showing a shading value of the two-dimensional image photographed by the CCD camera for each partition, wherein the image analyzer separately and quantitatively evaluates a glitter feeling and a particle feeling of the two-dimensional image photographed by the CCD camera, wherein the glitter feeling is a perception of an irregular minute brilliance produced by light regularly reflected from a brilliant pigment in the paint film, and wherein the particle feeling is an irregular non-oriented pattern caused by an orientation or an overlap of a brilliant pigment in the paint film containing a brilliant material when observing a sample under a lighting condition in which a brilliance feeling does not easily occur, wherein a total sum of brightness is obtained by totaling the brightness of each of the plurality of partitions, wherein an average brightness is obtained by dividing the total sum of brightness by a total number of the plurality of partitions, wherein a threshold is set at a value which is at least the average brightness, wherein the glitter feeling is evaluated on the basis of a brightness whose value is at least the threshold, and wherein the particle feeling is evaluated by a two-dimensional power-spectrum integral value obtained by integrating the power of a low-spatial-frequency component in accordance with a spatial frequency spectrum constituted by two-dimensional-Fourier-transforming the two-dimensional image, and normalizing the power with a DC component, the two-dimensional image photographed by the CCD camera having been divided into the plurality of partitions.

6. The computer color-matching method according to claim 5, further executing (4) correcting a selected paint blend by a color-matching-calculation logic after the step (3) to obtain a corrected blend closer to a reference color.

7. The computer color-matching method according to claim 6, wherein the prospective paint blend obtained in step (3) or the corrected blend obtained in step (4) is transferred to an electronic balance.

8. A computer color-matching method of for executing the following steps (1) to (3):

(1) measuring a paint film of a reference color to which a paint color should be adjusted through color-matching by a colorimeter to obtain color data of the reference color;

(2) measuring the paint film of the reference color to which the paint color should be adjusted through color-matching by a micro-brilliance-feeling measuring device to obtain micro-brilliance-feeling data of the reference color; and (3) selecting color data and micro-brilliance feeling data of at least one paint blend having the same color number as a preset color number of the reference color, and comparing the color data and the micro-brilliance-feeling data of the selected paint blend with the color data and the micro-brilliance-feeling data of the reference color, indexing the degree of matching of the color and micro-brilliance feeling of the selected paint blend, and selecting a prospective paint blend, wherein the method is performed by using a computer color-matching apparatus comprising: (A) the colorimeter, (B) the micro-brilliance-feeling measuring device, and (C) a computer in which a plurality of color numbers, paint blends corresponding to the color numbers, color data and micro-brilliance-feeling data corresponding to each of the paint blends, and color characteristic data and micro-brilliance-feeling characteristic data of a plurality of full-color paints are entered, and in which a color-matching calculation logic using the paint blends and the data operates, wherein the micro-brilliance-feeling measuring device comprises:

a light irradiation device operable to irradiate light to a paint film surface;

a CCD camera operable to photograph the light-irradiated paint film surface; and an image analyzer operable to analyze an image photographed by the CCD camera, wherein the micro-brilliance-feeling measuring device obtains a two-dimensional image of the paint surface by the CCD camera, divides the two-dimensional image into a plurality of partitions, and measures a brightness of each of the plurality of partitions, wherein the brightness is a digital gradation showing a shading value of the two-dimensional image photographed by the CCD camera for each partition, and wherein the image analyzer separately and quantitatively evaluates a glitter feeling and a particle feeling of the two-dimensional image photographed by the CCD camera, wherein the glitter feeling is a perception of an irregular minute brilliance produced by light regularly reflected from a brilliant pigment in the paint film, and wherein the particle feeling is an irregular non-oriented pattern caused by an orientation or an overlap of a brilliant pigment in the paint film containing a brilliant material when observing a sample under a lighting condition in which a brilliance feeling does not easily occur, wherein a total sum of brightness is obtained by totaling the brightness of each of the plurality of partitions, wherein an average brightness is obtained by dividing the total sum of brightness by a total number of the plurality of partitions, wherein a threshold is set at a value which is at least the average brightness, wherein the glitter feeling is evaluated on the basis of a brightness whose value is at least the threshold, and wherein the particle feeling is evaluated by a two-dimensional power-spectrum integral value obtained by integrating the power of a low-spatial-frequency component in accordance with a spatial frequency spectrum constituted by two-dimensional-Fourier-transforming the two-dimensional image, and normalizing the power with a DC component, the two-dimensional image photographed by the CCD camera having been divided into the plurality of partitions.

9. The computer color-matching method according to claim 8, further executing (4) correcting the selected prospective paint blend by a color-matching-calculation logic to obtain a corrected paint blend closer to the reference color.

10. The computer color-matching method according to claim 9, wherein the prospective paint blend obtained in step (3) or the corrected blend obtained in step (4) is transferred to an electronic balance.

* * * * *